Patented Oct. 25, 1927.

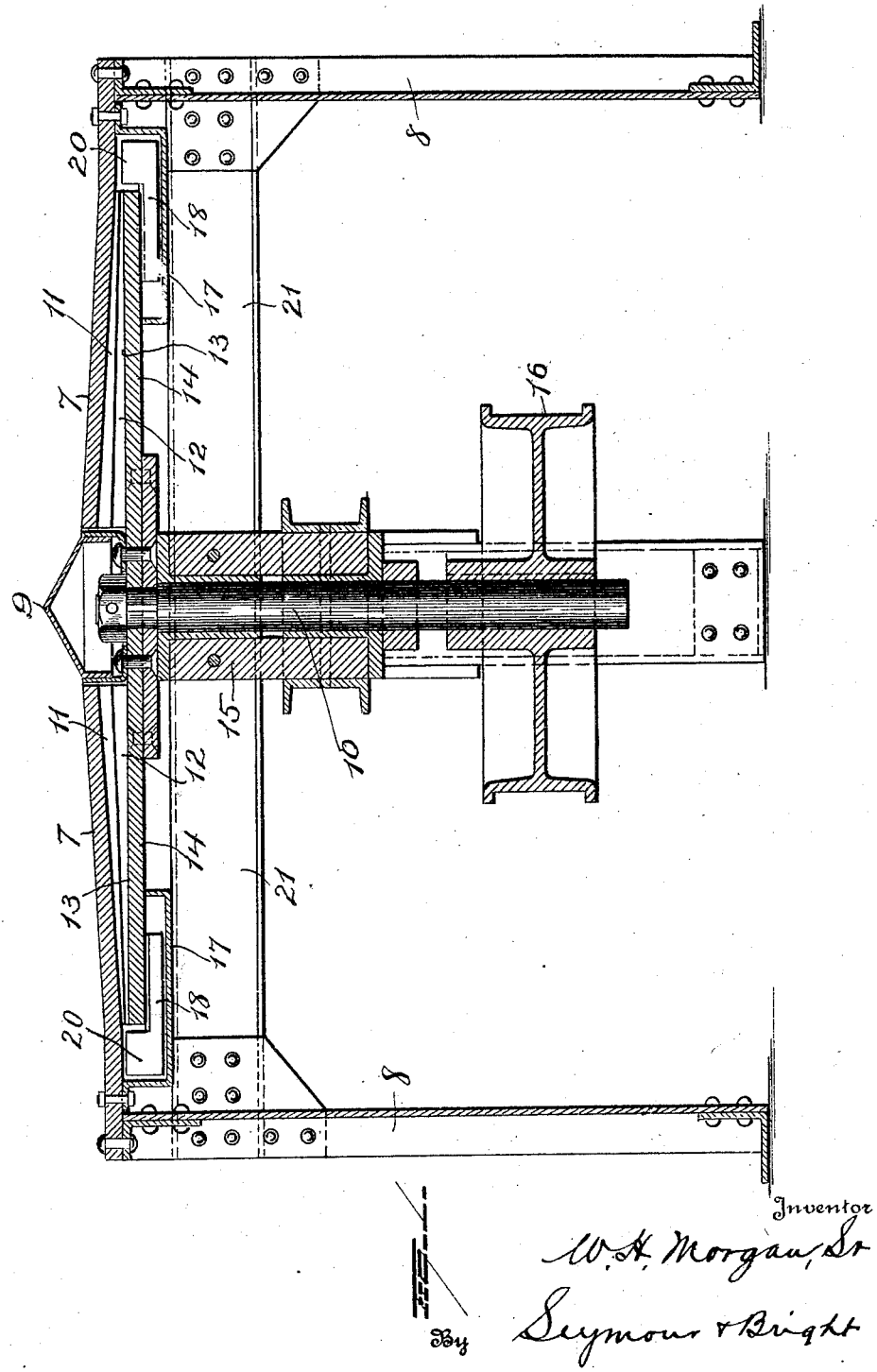

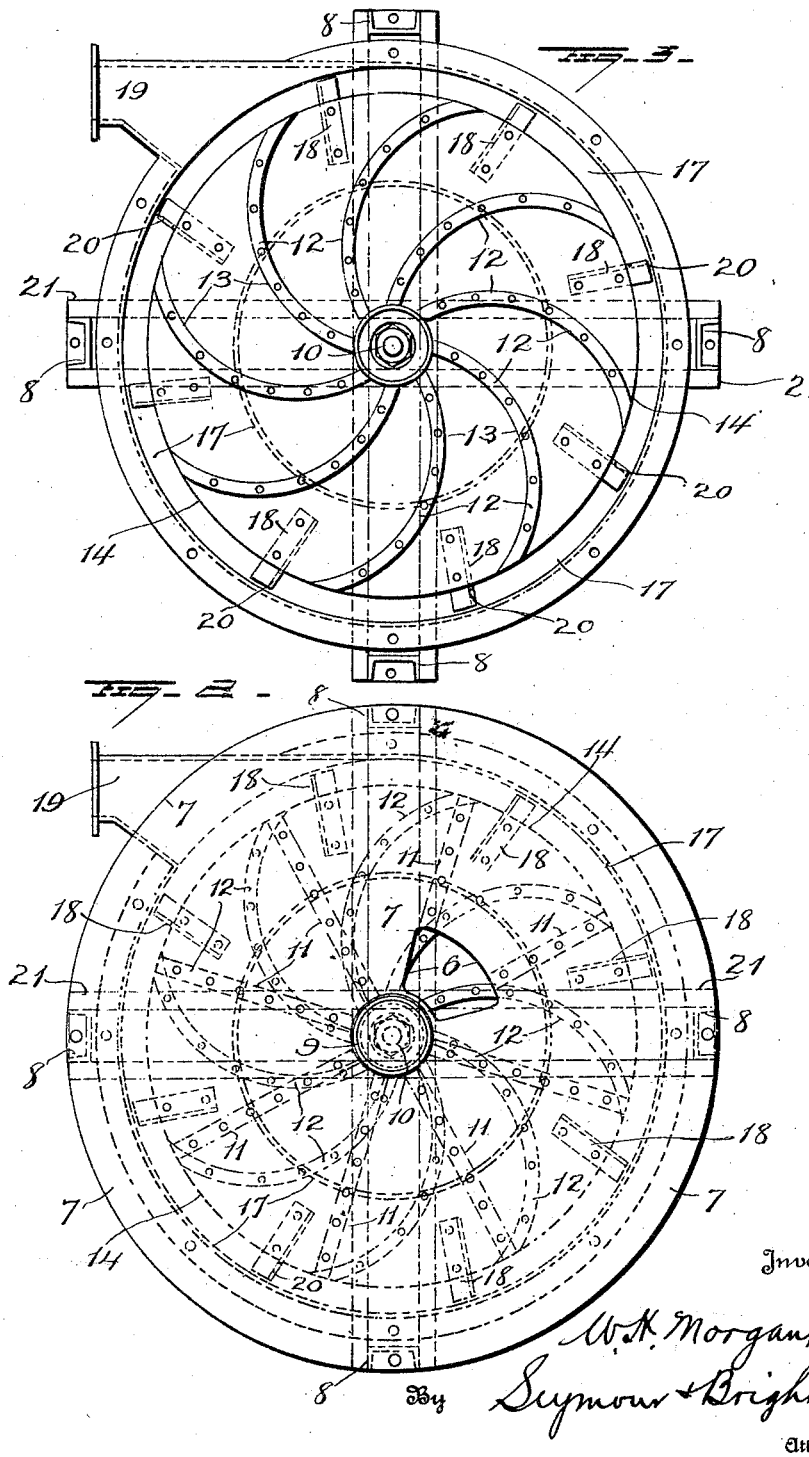

1,646,761

UNITED STATES PATENT OFFICE.

WILLIAM HENRY MORGAN, SR., OF ALLIANCE, OHIO, ASSIGNOR TO WILLIAM H. MORGAN, JR., OF ALLIANCE, OHIO.

APPARATUS FOR DISINTEGRATING SUGAR CANE.

Application filed June 4, 1925. Serial No. 34,873.

My invention relates to an improvement in continuous rotary centrifugal shear adapted particularly for converting sugar cane or other sugar producing material into a fibrous mass which will readily pass through juice extracting rolls, and which is designed to be used in connection with other mechanism for extracting the juice from the cane, and is an improvement on the construction disclosed in my application No. 755,532, filed December 12th, 1924.

The object of the present improvement is to provide means for housing the sheared material ejected at the periphery of the disintegrator and positively conveying it to a discharge spout so that it may be fed in a comparatively small and compact mass to a conveyor leading to the juice extracting apparatus.

With this and other objects in view my invention consists in the parts and combination of parts as will be more fully described and pointed out in the claims.

In the accompanying drawings, Figure 1 is a view in vertical cross section of the apparatus; Figure 2 is a view in plan of the same and Figure 3 is a view in plan of the top, the stationary disk being removed.

In using my shredder or disintegrator the cane is cut into short lengths, about six inches more or less and these cut sections are then fed to the disintegrator which is located in the mill.

The cane prepared in the manner above described is fed into an opening or openings 6 in the top member or plate 7 of the rotary shear, which plate is stationary and held in place by the supporting member 8. The feed opening or openings are located near the center of plate 7 which is circular in form and slightly conical. It is provided centrally with an opening closed by cap 9 which covers the upper end of shaft 10. This plate 7 is provided on its under side with a series of straight grooves which radiate from the center of the member, and each groove carries a shear blade or knife 11 which latter is beveled at its side edges and wedge shaped longitudinally the thicker ends of the knives being adjacent the center of plate as shown in Figure 1. The knives may be beveled at one or both side edges, but they may, if desired, be beveled on one side only so as to form cutting edges which co-act with the knives 12 located within grooves 13 formed in the lower plate 14. This lower plate is circular in form, of less diameter than the upper plate and is rigidly secured centrally to the upper end of shaft 10. This lower plate is flat so that when combined with the upper plate a gradually decreasing space is formed between the two plates, the space in the outer edge or periphery being comparatively smaller and constituting the outlet for the sheared or fibrous material. If desired, the lower or revolving plate may also be made slightly conical. The space between the two plates adjacent to the center, is considerably greater than the width of sugar cane stalk so as to permit the latter to be readily fed into this space and the centrifugal force set up by the revolution of the lower plate causes the material as it is sheared to flow outwardly toward the outer edge of lower revolving plate.

The knives 12 in the lower plate may also be beveled and are curved or scimitar shaped longitudinally and fit within similarly shaped recesses formed in the lower plate. The shears 12 of the lower plate are deeper or thicker at their inner ends so that the knives project at their inner ends a greater distance from the lower plate than they do at their outer edges. When the two plates with the knives are assembled the adjacent faces of the knives are parallel and nearly in contact.

Secured to the top or fixed plate or disk 7 is the circular trough shaped shield 17 which latter is secured to the underside of the upper disk 7 as shown in Figure 1, and projects downwardly, inwardly and upwardly and terminates well within the periphery of the lower disk 14, and close to the latter. This trough or shield 17 is as before stated circular in shape, and is so located that the shredded fibrous material which is ejected at the periphery of the rotary disk is caught up by said shield or trough, and is carried around therein by the fan blades 18 which latter are rigidly secured to the underside of the rotary disk or plate 14, and operate by suction or air blast and by direct contact to carry the shredded material around and discharge the same through the spout 19, from which it is carried by a conveyor or otherwise to the juice extracting apparatus.

The fan blades 18 project beyond the periphery of the revolving disk as shown and are enlarged at their outer ends as at 20, so as to project up approximately to or above the revolving disk 14 to engage the shredded material as it is ejected from the periphery of the disk. These blades are approximately as large as the cross sectional area of the trough or shield 17 so as to not only act as fan blades and create a blast or suction, but also to push the shredded material toward the discharge opening and prevent clogging of the spout or shield. This shield or spout is as before stated secured by screw bolts to the upper stationary disk, and also on one or both pairs of cross beams 21 which are secured to the supporting member 8, which as previously explained carry the upper stationary disk or plate 7.

The lower plate 14 as before stated, is secured to the upper end of shaft 10, which latter is mounted in the vertical bearings 15 and is provided with the pulley 16 by which it is rotated.

In the operation of the apparatus the material which may be cane or other stalks, or other material, to be disintegrated, is fed into the machine by gravity through a hopper or hoppers located above the opening 6 or openings in the upper plate 7. As the lower plate is rapidly revolved by a belt or a pulley 16, or by any suitable gearing, or by a direct connection with a vertical motor, the material will be thrown by centrifugal force outwardly between the shears on the upper and lower plates and coming in contact with said shears will be disintegrated into a fibrous mass, and thus put it in a condition to be readily passed between juice extracting rollers without any further crushing. The lower knives being scimitar shaped also have a tendency to aid the progress of the material from the center of the plates out towards the discharge openings between the plates. The knives are held to their respective upper and lower plates by means of bolts the heads of which are located in countersunk holes in the knives or cutters.

The shredded fibrous sections after they are ejected from between the two disintegrating disks is thrown into the trough or shield 17 and is carried by the fan blades 18 around to the discharge spout 19, which preferably discharges onto a conveyor which carries the fibrous sections up or to the juice extracting apparatus which latter may be of any approved type.

While the drawings show the upper disk stationary and the lower disk revolving, I do not wish to limit myself to this arrangement but that the upper disk might also be revolving in a direction opposite to the direction of rotation of lower disk. The product of the machine is a result of the relative rotation of the two disks, and this relative rotation can be obtained by either having one of the disks stationary and revolving the other, or as stated above, by revolving both of the disks but in opposite directions.

It is evident that many slight changes might be resorted to in the relative arrangement of parts shown and described without departing from the spirit and scope of my invention, hence I would have it understood that I do not wish to confine myself to the exact construction and arrangement of parts shown and described but, Having fully described my invention what I claim as new and desire to secure by Letters Patent, is:—

1. In an apparatus for converting sugar producing material into a fibrous mass, consisting of a member having cutting or shearing members on its lower face, a second member having cutting or shearing members on its inner face, the cutting or shearing member on the two shearing units of the apparatus coacting to shred or shear the sugar producing material longitudinally into a fibrous mass in contradistinction to grinding it into granular particles and one of said members being mounted to rotate, a shield embracing the periphery of the rotating member, a discharge spout connected with said shield and means actuated by the rotating member for forcing the material discharged into the shield through the discharge spout.

2. In an apparatus for converting material into a fibrous mass, consisting in a member having shear blades on its inner face, a second member having shear blades on its inner face, one of said members adapted to be rapidly revolved and one of them being conical shaped so that the space between them will be greater at the center than at the periphery so as to permit the stalks to be fed lengthwise or at right angles to the shaft carrying the movable member whereby the stalks will be cut or shredded into fibrous hay-like sections in contradistinction to grinding it into granular particles, the opposing faces on the two sets of shears approximately contacting throughout their lengths, a shield surrounding the periphery of the rotating member and provided with a discharge spout and means carried by the rotating member and located within the shield for forcing the shredded material toward and out of the exit spout.

3. In an apparatus for converting material into a fibrous mass consisting in a member having shear blades on its inner face, a second member having shear blades on its inner face, and means for rotating one of said members, and one of the latter being conical so that the space between them is greater at the center than at the periphery so as to permit the stalks to be fed lengthwise or at right angles to the shaft carrying the movable member whereby the stalks will be carried around and shredded into fibrous hay-like sections in contradistinction to grinding it into granular particles, and the adjacent faces of the shear blades being approximately in contact, a trough shaped shield embracing the periphery of the rotating disintegrating member provided with a discharge spout and means on the rotary member for projecting the sheared mass in the shield to the discharge spout of the latter.

4. In an apparatus for converting material into a fibrous mass, consisting in an upper member having shear blades on its lower face, a lower member having shear blades on its upper face, the blades of one of said members being scimitar shape to assist centrifugal force in carrying the fibrous mass to the discharge opening at the periphery of said members, means for rotating one of said members, a trough shaped shield embracing the periphery of the rotating member and means on the rotating member for assisting in the removal of the material from between the two shredding members forcing the fibrous material to the discharge spout of the shield.

5. In an apparatus for converting material into a fibrous mass in contradistinction to grinding into granular particles for the subsequent extraction of the juice therefrom, consisting of a conical fixed member having shear blades, a flat member having shear blades on its inner face, means for rotating the last mentioned member, a trough shaped shield embracing the rotating member, and provided with a discharge spout and means carried by said rotating member for forcing the shredded material deposited in the trough to the discharge exit in the latter.

6. In an apparatus for converting material into a fibrous mass for the subsequent extraction of the juice therefrom, consisting of an upper fixed member having shear blades, a second member having shear blades on its inner face, means for rotating the lower member whereby the stalks will be carried outwardly lengthwise and around between the two shearing surfaces and finally ejected between the peripheries thereof, a trough shaped shield embracing the periphery of the rotating member and provided with a discharge spout and fan blades secured to said rotating member and moving within the shield.

7. In an apparatus for converting material into a fibrous mass for the subsequent extraction of the juice therefrom, consisting of a fixed member having shear blades, a coacting member having shear blades on its upper face, means for rotating the lower member whereby the stalks fed into the space between the two shearing members will be carried around and outwardly until it is thoroughly shredded in contradistinction to grinding it into granular particles, a trough shaped shield rigidly secured in place around the periphery of the rotating member, overlapping the latter and provided with a discharge spout and means carried by the rotating member and moving in the trough for forcing the shredded material to the exit or the discharge opening in the latter.

8. In an apparatus for converting material into a fibrous mass for the subsequent extraction of the juice therefrom, consisting of a fixed member having shear blades, a coacting member having shear blades on its upper face, means for rotating the member whereby the stalks will be carried around with its long axis at right angles to the axis of the rotating member whereby the stalks will be shredded into a fibrous hay-like mass in contradistinction to grinding into granular particles, a trough shaped shield secured to the upper fixed member and embracing and overlapping the periphery rotating member, and blades on the rotating member and moving in the shield, the said blades being of approximately the shape of the cross section of the trough or shield.

9. In an apparatus for converting material into a fibrous mass in contradistinction to a granular mass, consisting in an upper member having shear blades on its lower face, a lower member having shear blades on its upper face, one of said members adapted to be rapidly revolved and one of them being conical shaped so that the space between them will be greater at the center than at the periphery to permit the material to be fed into the shearing space with its long axis approximately at right angles to the axis of the revolving shear member, the opposing faces on the two sets of shears being approximately horizontal and nearly contacting throughout their lengths.

10. In an apparatus for converting material into a fibrous mass in contradistinction to a granular mass consisting in an upper member having shear blades on its lower face, a lower member having shear blades on its upper face, and means for rotating one of said members, and one of the latter being conical so that the space between them is greater at the center than at the periphery to permit the sugar producing material to be fed into the space between the shearing surfaces, approximately at right angles to the axis of the rotating member, and the adjacent faces of the shear blades being horizontal and approximately in contact.

11. In an apparatus for converting material into a fibrous mass, consisting in an upper member having shear blades on its lower face, a lower member having shear blades on its upper face, both of said plates being grooved to receive the shear blades, and means for rotating one of said members and one of the latter being conical so that the space between them is greater at the center than at the periphery.

12. In an apparatus for converting material into a fibrous mass, consisting in an upper member having shear blades on its lower face, a lower member having shear blades on its upper face, the blades of one of said members being scimiter shape to assist centrifugal force in carrying the fibrous mass to the discharge opening at the periphery of said members, and means for rotating one of said members.

13. In an apparatus for converting material into a fibrous mass for the subsequent extraction of the juice therefrom in contradistinction to a granular mass, consisting of an upper conical fixed member having shear blades, a lower flat member having shear blades on its upper face, and means for rotating the lower member.

14. In an apparatus for converting sugar producing material into a fibrous mass from which the juice may be readily extracted, consisting of an upper member, a lower member, one of said members being conical and the upper one provided with a feed opening and both provided with recesses for shear teeth, and means for rotating one of said members.

15. In an apparatus for converting sugar producing material into a fibrous mass from which the juice may be readily extracted consisting of a fixed upper conical member, a rotating lower flat member, each of said members having grooves on its face adjacent the other member, shear blades located within said grooves and projecting beyond the plates toward each other, and means for rotating the flat member.

16. In an apparatus for converting sugar producing material into a fibrous mass from which the juice may be readily extracted, consisting of an upper conical member, a rotating lower flat member each of said members having grooves on its inner face the grooves on one member being scimiter shaped and shear blades mounted within said grooves and projecting beyond the plates toward each other, and means for rotating the lower member.

17. In an apparatus for converting sugar producing material into fibrous mass from which the juice may be readily extracted, consisting of an upper fixed member, a lower rotating member, each of said members having grooves on its inner face, the grooves on the rotating member being scimiter shaped, shear blades on both sets of grooves, those in the scimiter shaped grooves being correspondingly shaped lengthwise, the shear blades on both members mounted in the grooves and projecting beyond the plates toward each other, the adjacent faces or edges of the shearing blades being substantially horizontal and approximately contacting, and means for rotating one of said members.

18. In an apparatus for converting sugar producing material into a fibrous mass from which the juice may be readily extracted, consisting of an upper fixed member, a lower rotating member, each of said members having grooves on its inner faces, the grooves on the rotating member being scimiter shaped, shear blades in both of said grooves, those in the scimiter shaped grooves being correspondingly shaped and both sets of blades being wedge shaped longitudinally.

19. In an apparatus for converting sugar producing material into a fibrous mass from which the juice may be readily extracted, consisting of an upper fixed member, a lower rotating conical member, each of said members having grooves on its inner face, shearing blades each having an inclined outer face to form a shearing edge and means for rotating one of said members.

In testimony whereof, I have signed this specification.

WILLIAM HENRY MORGAN, Sr.